United States Patent Office 3,166,609
Patented Jan. 19, 1965

3,166,609
BLENDS OF TRANS-POLYBUTADIENE
WITH RUBBER
Charles R. Wilder, Bartlesville, Okla., assignor to Phillips
Petroleum Company, a corporation of Delaware
No Drawing. Filed Nov. 21, 1960, Ser. No. 70,420
9 Claims. (Cl. 260—894)

This invention relates broadly to rubber blends. In accordance with one aspect, this invention relates to blends of trans-polybutadiene having at least 70 percent of the molecular structure in a trans-configuration with high Mooney viscosity rubbers. In accordance with another aspect, this invention relates to a process for improving certain properties of high trans-polybutadiene polymers without significantly affecting other desirable physical properties of the polymer.

Among new diene polymers produced by solution polymerization, polybutadienes having at least 70 percent of the molecular structure in a trans-configuration has been found to have properties similar to gutta-percha. These products are useful as replacements for naturally occurring balata and gutta-percha in the insulation of electrical conductors, the fabrication of shoe soles, as packaging materials and numerous other applications. However, while the polybutadienes containing substantial amounts of trans 1,4-configuration have excellent utility in many applications, the high trans-polybutadienes have exhibited certain disadvantages regarding their processing characteristics such as softening temperatures, molding temperatures, milling temperatures, and the like, which are often high and makes these polymers unsatisfactory for certain uses. For example, one of the particularly significant uses of these trans-polybutadienes is their applicability as covers for golf balls. However, it has been observed that molding temperatures of trans-polybutadiene is generally above about 200° F. and that in the fabrication of golf balls such temperatures are often undesirable because of detrimental effects on the windings and other internal structures of the ball. Therefore, it can be seen that it would be desirable if the softening temperature, for example, could be significantly decreased without detrimentally affecting other desirable physical properties of the polymer.

It has now been found that the softening temperature, the molding temperature, as well as the milling temperature of high trans-polybutadienes can be lowered, and that other physical properties of the parent polymer remain essentially unchanged, by blending therewith a high Mooney viscosity rubber.

Accordingly, it is an object of this invention to provide blends of trans-polybutadiene with a rubber having a high Mooney viscosity having improved physical properties.

It is another object of this invention to provide blends of trans-polybutadiene with a rubber which exhibit good softening temperatures, molding temperatures, milling temperatures and the like.

It is another object of this invention to provide a means for extending trans-polybutadiene to improve certain of its properties without sacrificing other desirable properties of the polymer.

It is still another object of this invention to provide blends containing trans-polybutadiene which have good processing properties.

Still other objects, advantages and features of this invention will be apparent to those skilled in the art upon consideration of this disclosure and the appended claims.

The above and other objects of this invention are accomplished by preparing a rubber blend comprising a synthetic polybutadiene containing at least 70 percent butadiene joined together by trans 1,4-linkage with from 10 to 60 weight parts per 100 parts blend of a rubber having a Mooney viscosity (ML–4 at 212° F.) of at least 75 and generally not higher than 200. Of course, additives such as carbon black, antioxidants, softeners and other additives and preservatives known in the art can be present in the blend.

I have found that certain physical properties, for example, the softening point, of trans-polybutadiene can be significantly lowered by blending therewith from 10 to about 60 percent of certain rubbers having a Mooney viscosity above about 75 and that the other preferred physical properties of the trans-polybutadiene are not essentially altered thereby.

The trans-polybutadienes which are utilized in the rubber compositions of this invention can be produced by any of the known polymerization processes which yield predominantly trans 1,4-butadiene polymers. The trans-polybutadiene which can be employed in the rubber blends of this invention is one in which at least 70 percent and up to 100 percent of the polymer is formed by trans 1,4-addition of the butadiene, the remainder of the polymer being formed by cis 1,4- and 1,2-addition of the butadiene. The amount of the trans-polybutadiene which is employed in the blends of this invention and the trans 1,4-content of the polymer will depend upon the desired ultimate use of the blend and the physical properties desired for the ultimate use. In general, however, the blend will contain at least 40 weight percent trans-polybutadiene and preferably at least 50 weight percent. A particularly preferred range is 20 to 50 weight percent high Mooney viscosity rubber and from 50 to 80 weight percent of the trans-polybutadiene.

As has been indicated, the trans-polybutadiene useful in this invention can be prepared by any method known to the art, this invention being in the blended composition. One process for preparing such polymers is fully described and claimed in copending application of R. Zelinski et al. filed April 20, 1956, and having Serial No. 579,429, now U.S. Patent 3,050,513. According to that application 1,3-butadiene is polymerized in the presence of a catalyst composition comprising (a) a complex aluminum hydride of an alkali metal, and (b) titanium tetraiodide. The polybutadiene produced by that method is a rubbery polymer with from about 70 to 90 percent trans 1,4-addition and up to and including 10 percent 1,2-addition, the remainder being cis 1,4-addition.

The high Mooney viscosity rubber materials used as additives to blend with the trans-polybutadienes in the present invention can be either natural or synthetic rubber having a Mooney value (ML–4 at 212° F.) higher than 75. Rubber homopolymers of 1,3-butadiene having high vinyl- or cis-linkage and copolymers of conjugated dienes, especially butadiene, with monomeric material copolymerizable therewith are preferred. The synthetic rubbers which are utilized in the blended compositions of this invention can be produced by any of the known polymerization processes which yield these polymers.

As has been indicated, the cis-polybutadienes useful in this invention can be prepared by any method known in the art, this invention being in the blended composition. One means for preparing such polymers is fully described and claimed in the copending application of Robert P. Zelinski et al. filed April 16, 1956, and having Serial No. 578,166. According to that application, 1,3-butadiene is polymerized in the presence of a catalyst composition comprising (a) a trialkyl aluminum and (b) titanium tetraiodide. The polybutadiene produced by that method is one in which the rubbery polymer is formed by cis 1,4-addition, trans 1,4-addition and 1,2-addition, at least about 85 percent of the polymer being formed by cis 1,4-addition.

The vinyl polybutadienes useful in this invention can be prepared by any method known to the art also. One process for preparing such polymers is fully described and claimed in copending application of Robert P. Zelinski et al. filed April 30, 1956, and having Serial No. 581,344, now abandoned. According to that application, 1,3-butadiene is polymerized in the presence of a catalyst composition comprising (a) an ether solution of a complex aluminum hydride of an alkali metal and (b) titanium tetrachloride. The polybutadiene produced by that method is a rubbery polymer having a major proportion of 1,2-addition and in some instances up to 80 percent and higher 1,2-addition.

Natural rubber is well known to the art and no further discussion thereof is needed here.

Other rubber polymers that can be employed for preparation of the blends of this invention include synthetic rubber polymers of open-chain conjugated dienes having from 4 to 10 carbon atoms per molecule exemplified by 1,3-butadiene, 1,3-pentadiene, 2-methyl-1,3-butadiene (isoprene), 2,3-dimethyl-1,3-butadiene and the like and rubber copolymers of these and similar conjugated dienes with each other or with copolymerizable materials containing a single ethylenic linkage such as styrene, alpha-methyl styrene, methyl acrylate, methyl methacrylate, ethyl acrylate, ethyl methacrylate, 2-vinylpyridine, 2-methyl-5-vinylpyridine, 2-vinylquinoline, acrylonitrile, or the rubber polymers or copolymers of such conjugated dienes as chloroprene and similar materials. In general, such rubber copolymers will be prepared from monomers comprising at least 50 weight percent conjugated dienes.

The blends of this invention can be prepared in a variety of ways, but the preferred method for admixing the trans-polybutadienes with the high Mooney rubbers is with mechanical mixers such as roll mills or Banburys either with or without plasticizers, peptizers or other processing aids at a temperature ranging from about 200 to about 400° F., preferably from about 200 to about 250° F. Suitable compounding ingredients can be incorporated during the blending step when desired. When compounding is effected subsequent to the blending step, considerably lower temperatures can be used during milling, such temperatures being from about 80 to as high as 400° F. After admixing the trans-polybutadiene with the high Mooney rubber in the desired ratio, the resulting blend can be compounded and vulcanized by well known vulcanization recipes, as for example, sulfur plus an accelerator at 307° F. for 30 minutes. The resulting blends, after vulcanization, have excellent physical properties. A still further advantage of the rubber blends of this invention is their processability. While trans-polybutadienes are difficult to mill, the blends of this invention blend well on a roll mill.

The blends produced in accordance with this invention have utility in applications where natural and synthetic rubbers are used. They can be used in the manufacture of rubber articles such as gaskets, tubing, covering for wire and cable, rubber heels, rubber tile, golf ball covers and the like. Another application for the blends of the present invention lies in their use as a base for the manufacture of chewing gum. Their low softening temperature and ease of milling render them particularly desirable for this use. In general, the amount of rubbery additive employed for preparing blends for chewing gum bases will be in the range 20 to 50 weight parts per 100 weight parts of blend. Waxes, natural chicle, flavoring and the like can be added to the blend.

A better understanding of my invention will be obtained upon reference to the following illustrative examples which are not intended, however, to be unduly limitative of this invention.

EXAMPLE I

A blend was prepared by mixing 75 parts by weight of trans-polybutadiene (88 percent trans) with 25 parts by weight of vinyl polybutadiene, blending being done on a hot mill. Mooney value (ML-4 at 212° F.) was 95 for the blend as compared with a value for the trans-polybutadiene of 112 and for the vinyl-polybutadiene of 75. After blending was completed the temperature of the mill rolls was reduced until the mix would no longer mill, the final temperature being recorded. It was found that while a trans-polybutadiene control ceased to mill at 185° F., the blend banded tightly when the mill temperature was as low as 80° F.

In order to determine the effect of the added vinyl polybutadiene on the properties of the trans-polybutadiene a portion of the blend was compounded, cured, and evaluated, a trans-polybutadiene control being run for comparison. Data on this evaluation are presented in Table I.

Table I

|  | Parts by Weight | |
| --- | --- | --- |
|  | Run 1 | Run 2 (Control) |
| Trans-Polybutadiene | 75 | 100 |
| Vinyl Polybutadiene | 25 |  |
| Zinc Oxide | 3 | 3 |
| Stearic Acid | 2 | 2 |
| Flexamine [1] | 1 | 1 |
| Sulfur | 1.75 | 1.75 |
| NOBS Special [2] | 1.6 | 1.6 |

Physical Properties (30 Min. Cure at 307° F.)

| 300% Modulus | [3] | [3] |
| --- | --- | --- |
| Tensile, p.s.i | 540 | 810 |
| Elongation, Percent | 400 | 300 |
| Lupke Rebound [4] | 75 | 78 |
| Shore Hardness [5] | 87 | 94 |

[1] 65% diarylamine-ketone reaction product and 35% N,N'diphenyl-p-phenylenediamine (antioxidant).
[2] n-oxdiethylene benzothiazole-2-sulfenamide ((accelerator).
[3] Modulus same as tensile at all elongations.
[4] Apparatus and method described in Vanderbilt Rubber Handbook, page 220 (1958).
[5] Shore Durometer, Type A.

Samples of the blend and of the parent trans-polybutadiene were molded into pellets and evaluated in the Goodrich plastometer. The data obtained were plotted to give an estimated softening point. Results of these tests are presented in Table II.

Table II

|  | Run 1 | Run 2 (Control) |
| --- | --- | --- |
| Original Height Pellet, Mils | 435 | 435 |
| Height After Heating 1 min. at— |  |  |
| 170° F | 410 | 416 |
| 180° F | 390 | 411 |
| 190° F | 379 | 406 |
| 200° F | 315 | 412 |
| 205° F |  | 396 |
| 210° F | 138 | 212 |
| 220° F | 43 | 13 |
| Softening Point From Plot | 198 | 206 |

The trans-polybutadiene-vinyl polybutadiene blend was found to be moldable at 175° F. as compared with 210° F. for the parent trans-polymer.

In summary, this example shows that by blending vinyl polybutadiene with trans-polybutadiene the following advantages are realized:

(1) Molding temperatures are reduced from 210° F. or higher to 175° F. or lower.
(2) Softening temperature is reduced from 206° F. to 198° F.
(3) Milling can be effected at temperatures as low as 80° F. compared with a minimum of 185° F. for the parent trans-polymer.

(4) Significant physical properties of the parent polymer remain essentially unchanged.

EXAMPLE II

Blends of trans-polybutadiene (93% trans) with selected high Mooney polymers were made, blending being done on a hot (230° F.) mill. After blending was completed, the temperature of the mill was reduced to determine low temperature milling properties. Stocks and molding properties are shown in Table III.

*Table III*

|  | Parts by Weight | | | |
|---|---|---|---|---|
| Run | 3 | 4 | 5 | 6 |
| Paracril B (Butadiene/acrylonitrile copolymer) [1] | 25 | | | |
| Cis-polybutadiene (95% Cis) [2] | | 25 | | |
| Butadiene/styrene copolymer (24% bound styrene) [3] | | | 25 | |
| Trans-polybutadiene (93% trans) [4] | 75 | 75 | 75 | 100 |
| Minimum Milling Temp., °F | 80 | 80 | 80 | 185 |
| Molding Temp., °F | 175 | 175 | 175 | 210 |
| Appearance | ([5]) | ([5]) | ([5]) | ([6]) |

[1] Mooney @ 212° F. (ML-4), 80-90.
[2] Mooney @ 212° F. (ML-4), 110.
[3] Mooney @ 212° F. (ML-4), 104.
[4] Mooney @ 212° F. (ML-4), 104.
[5] Smooth-Flexible.
[6] Smooth-Brittle.

This example shows that by blending high Mooney polymers with trans-polybutadiene, milling and molding temperatures are significantly reduced and that smooth, flexible stocks are obtained.

EXAMPLE III

Blends of trans-polybutadiene with vinyl polybutadiene (98% vinyl, 1.5% trans) and with butadiene-styrene rubber (104 ML-4 at 212° F.) were prepared, the polymers being mixed on a roll mill at approximately 250° F. for about 10 minutes. Data on these tests are shown in Table IV.

*Table IV*

|  | Parts by Weight | |
|---|---|---|
| Run | 7 | 8 |
| Trans-polybutadiene (88% trans) [1] | 50 | |
| Vinyl-polybutadiene | 50 | |
| Trans-polybutadiene (93% trans) [2] | | 45 |
| Butadiene/styrene rubber | | 45 |
| Paraffin wax [3] | | 10 |
| Observation | Hardness reduced; Tack increased; Compatible with chicle; Low softening point (<80° F.). | Low softening point (<80° F.). |

[1] Softening point of 206° F.
[2] Minimum milling temperature of 185° F.
[3] Added on the mill.

EXAMPLE IV

A 75/25 (by weight) blend of trans-polybutadiene (93% trans same as used in Example II) and butadiene-acrylonitrile copolymer (Paracril B same as used in Example II) was prepared using a small amount of liquid paraffin as a softener. Mixing was effected on a roll mill at approximately 250° F. and was continued for about 10 minutes. Low softening (<80° F.) temperature of the blend was observed.

EXAMPLE V

A series of tests was made in which blends of trans-polybutadiene with a high Mooney (104 ML-4) were compounded in various recipes to determine their properties as chewing gum base stocks. Mixing was effected on a roll mill at approximately 250° F. and was continued for about 10 minutes. Data on these tests are shown in Table V.

*Table V*

|  | Parts by Weight | | | |
|---|---|---|---|---|
|  | Run 9 | Run 10 | Run 11 | Run 12 [1] |
| Trans-polybutadiene [2] | 50 | 50 | | 50 |
| Butadiene/styrene rubber [3] | 50 | 50 | | 50 |
| Gum base [4] | | | 100 | |
| Liquid paraffin | 10 | 10 | 100 | 60 |
| Paraffin wax | 10 | 10 | | 10 |
| Purecal U [5] | | | | 40 |
| Glycerine | | | | 10 |
| Shore A Hardness | [6] 42 | [6] 10 | [6] 1 | [7] 2 |
| Tensile, p.s.i. [8] | 25 | 0 | 0 | |
| Elongation, percent [8] | 10 | 10 | 100 | |

[1] This sample chewed easily and with flavoring, sugar, etc., would have been acceptable chewing gum.
[2] 93% trans.
[3] 75/25 butadiene-styrene emulsion polymerized Mooney @ 212° F. (ML-4) 104 Rubber had 24% bound styrene.
[4] Clark's gum base.
[5] Chalk.
[6] 30 seconds @ 92° F.
[7] 30 seconds @ 80° F.
[8] 2 in./min. machine speed.

As will be evident to those skilled in the art, many variations and modifications of this invention can be practiced in view of the foregoing disclosure. Such variations and modifications are clearly believed to come within the spirit and scope of the invention.

I claim:

1. As a new composition of matter, a blend comprising an unvulcanized trans-poly butadiene having at least 70 percent trans 1,4-addition, not more than 10% 1,2-addition and the remainder being cis 1,4-addition, and from 10 to 60 weight parts per 100 parts of blend of a different unvulcanized rubbery polymer containing at least 50 weight percent of a polymerized conjugated diene having from 4 to 10 carbon atoms per molecule and having a Mooney viscosity (ML—4 at 212° F.) of at least 75.

2. The vulcanized product of claim 1.

3. A composition according to claim 1 wherein said rubber is a polybutadiene which contains a major proportion of the butadiene joined together by vinyl 1,2-linkage.

4. A composition according to claim 1 wherein said rubber is a polybutadiene which contains at least 70 percent of the butadiene joined together by cis 1,4-linkage.

5. A composition according to claim 1 wherein said rubber is a copolymer of butadiene and styrene.

6. A composition according to claim 1 wherein said rubber is a coplymer of butadiene and acrylonitrile.

7. A method for preparing a blend of trans-polybutadiene and rubber of improved physical properties which comprises mixing together and milling an unvulcanized trans-polybutadiene having at least 70 percent of the butadiene joined together by trans 1,4- linkage, not more than 10 percent 1,2-addition and the remainder being cis 1,4-addition, with a different unvulcanized rubbery polymer containing at least 50 weight percent of a polymerized conjugated diene having from 4 to 10 carbon atoms per molecule and having a Mooney viscosity (ML-4 at 212° F.) of at least 75 in an amount sufficient to reduce the softening point of said polybutadiene.

8. A process according to claim 7 wherein said blend is compounded and vulcanized.

9. As a new composition of matter, a blend of rubbers having improved milling and molding characteristics comprising (1) 50 to 80 weight parts of an unvulcanized trans-polybutadiene having at least 70 percent trans-1,4-addition and (2) 20 to 50 weight parts of an unvulcanized cis-polybutadiene having at least 85 percent cis-1,4-addition and having a Mooney viscosity (ML-4 at 212° F.) of 75–200, the aforementioned parts by weight ranges being based on 100 parts by weight of total rubbers contained in the blend.

References Cited in the file of this patent

UNITED STATES PATENTS

| | | |
|---|---|---|
| 2,259,060 | Brown | Oct. 14, 1941 |
| 2,610,163 | Te Grotenhuis | Sept. 9, 1952 |
| 2,726,221 | Semegen et al. | Dec. 6, 1955 |
| 3,050,513 | Zelinski et al. | Aug. 21, 1962 |
| 3,060,989 | Railsback et al. | Oct. 30, 1962 |
| 3,067,188 | Naylor | Dec. 4, 1962 |

OTHER REFERENCES

Scott: Transactions of the Institution of the Rubber Industry, pages 53–65, August 1964.

Kraus et al.: "The Rubber and Plastic Age," vol. 38, No. 10, October 1957.